United States Patent [19]

Aronova et al.

[11] 3,846,490
[45] Nov. 5, 1974

[54] METHOD OF PRODUCING ZETA-AMINOLEVULINIC ACID HYDROCHLORIDE

[76] Inventors: Nina Ivanovna Aronova, Peschanaya ulitsa, 12, kv. 54; Nina Nikolaevna Makhova, Belomorskaya ulitsa 22, korpus 2, kv. 7; Sergei Ivanovich Zavyalov, ulitsa Garibaldi 23/56, korpus 4, kv. 54; Jury Borisovich Volkenshtein, ulitsa Stanislavskoyo 12/9, kv. 37a; Galina Mikhailovna Kunitskaya, Novocheremushkinskaya ulitsa 50, korpus 1, kv. 24, all of Moscow, U.S.S.R.

[22] Filed: Mar. 1, 1972

[21] Appl. No.: 230,984

[52] U.S. Cl............................................ 260/534 R
[51] Int. Cl..................... C07c 99/00, C07c 101/04

[58] Field of Search ................................. 260/534 R

[56] References Cited
FOREIGN PATENTS OR APPLICATIONS
266,773   4/1970   U.S.S.R.
1,049,770   11/1966   Great Britain ...................... 260/534

*Primary Examiner*—Vivian Garner
*Attorney, Agent, or Firm*—Eric H. Waters

[57] ABSTRACT

A method of producing δ-aminolevulinic acid hydrochloride comprises acylating hippuric acid with monosuccinate acyl-chloride in the medium of 65-picoline, subjecting the thus-obtained c-acyl derivative to hydrolysis and isolating the final product.

δ-Aminolevulinic acid hydrochloride can find application in the biosynthesis of vitamin $B_{12}$.

2 Claims, No Drawings

METHOD OF PRODUCING ZETA-AMINOLEVULINIC ACID HYDROCHLORIDE

The present invention relates to a method of producing δ-aminolevulinic acid hydrochloride.

δ-Aminolevulinic acid is a precursor of vitamin $B_{12}$, heme and chlorophyll; it causes a 2-3 fold stimulation of the biosynthesis of vitamin $B_{12}$ and porphyrins by suspensions of propionic-acid bacteria. δ-Aminolevulinic acid hydrochloride can find application for the biosynthesis of vitamin $B_{12}$. Known in the art heretofore is a method of producing δ-aminolevulinic acid hydrochloride from 2-phenyl-oxazoline-5-one by acetylating the latter with monomethyl-succinate acyl-chloride in β-picoline, the yield of the final product being approximately 2.6 wt. percent of theory, as calculated for the initial 2-phenyl-oxazoline-5-one.

A disadvantage inherent in said method resides in a low yield of the final product, as well as the use of 2-phenyl-oxazoline-5-one as the starting material, said compound being a labile and rapidly decomposing one which necessitates its introduction into the reaction in a freshly prepared state.

Another known method for producing δ-aminolevulinic acid hydrochloride is by acylating 2-phenyl-oxazoline-5-one with monomethyl-succinate acyl-chloride in γ-picoline medium, followed by hydrolysis of the thus-obtained c-acyl derivative. The reaction solution resulting from hydrolysis is evaporated and the thus-formed crystals are washed with acetone to obtain a product with m.p. equal to 138°-143°C. Then the crystalline product is washed with boiling isopropanol to obtain the final product having a melting point at 147°-149°C. The yield of the final product is about 28-29 wt. percent (cf., USSR Author's certificate No. 266773).

A disadvantage of the aforementioned method resides in a low yield of the final product, the necessity to use such a rapidly decomposing substance as 2-phenyl-oxazoline-5-one as the starting material, as well as too involved isolation technique of the final product.

It is an object of the present invention to increase the yield of the final product and simplify the isolation technique thereof.

Said object is accomplished due to the fact that in a method of producing δ-aminolevulinic acid hydrochloride by acylating glycine derivatives with monosuccinate acyl-chloride in the medium of γ-picoline, followed by hydrolysis of the thus-obtained c-acyl derivative and isolation of the final product, according to the invention use is made of hippuric acid (benzoyl glycine) as the glycine derivative. To increase the yield and improve the quality of the final product, the acylation process is expediently carried out at -5° to 0°C.

The isolation of the final product is expediently effected by dissolving the product of hydrolysis in concentrated hydrochloric acid, followed by precipitating the final product with acetone.

The herein-proposed method is carried into effect as follows.

Hippuric acid is acylated in the γ-picoline medium with monomethyl succinate acyl-chloride. The acylation process is preferably carried out within the temperature range from -5°C to 0°C. The reaction mass is kept at that temperature for 5 hours after adding acyl-chloride thereto, whereupon it is poured into ice with concentrated hydrochloric acid and the thus-formed crystals of 2-phenyl-4-(β-carbalkoxy-propionyl)-oxazoline-5-one are filtered off and washed with water. Then a sampled specimen is dried. Should the melting point of the product be found to lie above 165°C, it is subject to hydrolysis by boiling with diluted (1:1) hydrochloric acid; if the melting point lies below 165°C, the product is washed with ethyl acetate and the melting point is again determined (178°-180°C as per literature). The purer the intermediate oxazolinone, the higher the quality of the final product.

The final product can be isolated by resorting to currently used methods. The most expedient method of isolating the final product is carried out as follows.

Upon hydrolysis the precipitated benzoic acid is filtered off, the mother liquor is boiled with activated charcoal, then filtered, water and hydrochloric acid are distilled to dryness, concentrated hydrochloric acid is added to the residue, the latter is dissolved when heated and then δ-aminolevulinic acid hydrochloride is precipitated with acetone.

The yield of the final product is 55-57 wt. percent.

The herein-proposed method provides a threefold increase in the yield of the final product as compared to the known method. Apart from that, the proposed method makes it possible to dispense with the use of a labile starting material, viz, 2-phenyl-oxazoline-5-one which is applicable only in a freshly prepared state and whose synthesis involves a number of laborious operations. According to the proposed method, said product is substituted by inexpensive hippuric acid.

To promote understanding, the present invention is made more apparent from the disclosure of exemplary embodiments thereof illustrating the method of producing δ-aminolevulinic acid hydrochloride.

EXAMPLE 1

To a solution of 40 g hippuric acid in 200 ml γ-picoline placed in a 0.5-liter three-necked flask provided with a thermometer, stirrer and dropping funnel and cooled with an ice-and-common-salt mixture, were added, under constant stirring, 56 ml monomethyl-succinate acyl-chloride at such a rate that the temperature of the reaction mass was maintained within -5° to 0°C during approximately 2 hours.

Upon completing the addition of acyl chloride, the reaction mass was kept under stirring for another 5 hours, whereupon it was poured out into a mixture of 1 kg ice with 160 ml concentrated hydrochloric acid, while stirring.

The thus-precipitated crystals colored bright crimson, were filtered off and washed with water. A small sample specimen of oxazolinone was carefully dried and its melting point was determined. If the product is found to melt below 165°C, the whole amount of precipitate obtained is subjected to washing without drying. To this end, the precipitate is placed in a 250-ml flask provided with a stirrer, 110 ml ethyl-acetate is added thereto and the resultant mixture is stirred at room temperature for 30 min., then filtered through a Buchner filter, the precipitate is washed on a filter with another 50 ml ethyl-acetate and the sampled specimen is dried to find the melting point thereof.

The washed product melted at 176°-178°C.

The yield of non-washed air-dried oxazolinone was equal to 52.5 g (85 wt. percent), while that of the washed product, 41 g.(65 wt. percent). The thus-obtained paste of 2-phenyl-4-(β-carbomethoxypropionyl)-oxazoline-5-one was placed in a 1.5-liter single-necked flask and boiled for 10 hours with a reflux condenser together with 1 liter of diluted (1:1) hydrochloric acid. After having been cooled down to 20°C the precipitated benzoic acid was filtered off, the mother liquor was boiled with 20 g finely-disintegrated activated charcoal during 30 min. and water with hydrochloric acid was distilled off under vacuum.

To the remaining semicrystalline mass was added 20 ml hydrochloric acid, the mass was heated on a water bath until completely dissolved, whereupon 200 ml acetone was added under stirring. The precipitated crystals were filtered off 30 min. later, then washed on a filter with 10–20 ml acetone and air-dried. The yield of δ-aminolevulinic acid hydrochloride was 19 g (51 wt. percent), as calculated for hippuric acid), its m.p. being 152°–153°C.

EXAMPLE 2

The process was carried out in a way similar to that described in Example 1, including the hydrolysis step. The reaction solution resulting from hydrolysis was evaporated to dryness, some isopropanol was added to the residue, the crystals were filtered off, washed with isopropanol, then with acetone and thereupon air-dried. The yield of the final product having an m.p. at 139°–145°C, was 59 wt. percent as calculated for hippuric acid.

The thus-obtained product was dissolved in ethanol, the crystals being precipitated with ether. The yield of the final product having a m.p. at 143°–146°C was 48 wt. percent as calculated for hippuric acid.

What we claim is:

1. A method of producing δ-aminolevulinic acid hydrochloride comprising the steps of acylating hippuric acid with monosuccinate acyl chloride in a medium of γ-picoline at a temperature of −5° to 0°C to form a c-acyl derivative, hydrolyzing the c-acyl derivative and isolating the δ-aminolevulinic acid hydrochloride.

2. A method according to claim 1 wherein the δ-aminolevulinic acid hydrochloride is isolated by dissolving the product of the hydrolysis step in concentrated hydrochloric acid and adding acetone to the acid solution to precipitate the δ-aminolevulinic acid hydrochloride.

* * * * *